United States Patent [19]

Claflin

[11] 4,381,938

[45] May 3, 1983

[54] MULTI-PURPOSE ZONE CONTROLLED BLAST FURNACE AND METHOD OF PRODUCING HOT METAL, GASES AND SLAGS

[76] Inventor: H. Bruce Claflin, 2436 Park Blvd., Upland, Calif. 91786

[21] Appl. No.: 158,709

[22] Filed: Jun. 12, 1980

[51] Int. Cl.³ ............................................. C21B 5/06
[52] U.S. Cl. ........................................ 75/42; 48/210; 65/19; 75/91; 106/103; 208/11 R
[58] Field of Search ............... 75/41, 42, 91; 266/156; 48/210; 65/19; 106/103; 208/11 R

[56] References Cited

U.S. PATENT DOCUMENTS

| | | | |
|---|---|---|---|
| 1,836,005 | 12/1931 | Berry | 75/42 |
| 2,793,946 | 5/1957 | Paschal | 75/41 |
| 2,795,497 | 6/1957 | Elrander | 75/41 |
| 2,799,576 | 7/1957 | Gumz et al. | 75/41 |
| 2,952,533 | 9/1960 | Cuscoleca et al. | 75/42 |
| 3,375,098 | 3/1968 | Marshall | 75/35 |
| 3,458,307 | 7/1969 | Marshall et al. | 75/42 |
| 3,814,404 | 6/1974 | Claflin | 75/42 |
| 3,909,446 | 9/1975 | Miyashita et al. | 75/41 |
| 3,912,502 | 10/1975 | Miyashita et al. | 75/42 |
| 3,928,023 | 12/1975 | Claflin | 75/60 |
| 4,187,672 | 2/1980 | Rasor | 48/61 |

Primary Examiner—M. J. Andrews
Attorney, Agent, or Firm—Schuyler, Banner, Birch, McKie & Beckett

[57] ABSTRACT

Disclosed are methods of precisely operating an improved zone controlled multi-purpose blast furnace mainly by closely controlling gaseous inputs and outputs made through multiple openings in the side of the furnace. The energy can be partially or completely, directly or indirectly, obtained from low cost solid carbonaceous fuels used to produce hot metal, gases and slags, products. "Solution loss" is avoided when operating in a high hot metal production mode but the Boudouard reaction is efficiently employed when operating to produce gases and slags. Gas flows are regulated on the basis of information obtained from on-line samples and performance-impairing recycling alkali metals and zinc may be purged while in a volatile form.

24 Claims, 3 Drawing Figures

FULL LOAD BOILER UNIT EFFICIENCY VS. FUEL GAS HEATING VALUE ized in a molten condition); its tremendous but only partially used capacity as a gas producer; the fact that expensive coke is made from rapidly diminishing raw materials in an ecologically troublesome batch process; the fact that burden permeability in the bosh where there is a counterflow of downwardly moving molten material and upwardly moving gases is a process limiting factor; the fact that the high temperature heat requirements in the bosh and a high driving rate conflict with the need for economic reduction of burden oxides in the stack; the blast furnace process is presently the least controlled of all major iron and steel making processes; the fact that the productivity of these high capital investment pieces of equipment needs to be increased; and the fact that the quality and uniformity of the product need to be improved.

MULTI-PURPOSE ZONE CONTROLLED BLAST FURNACE AND METHOD OF PRODUCING HOT METAL, GASES AND SLAGS

BACKGROUND OF THE INVENTION

This invention relates to an improved multi-purpose zone controlled blast furnace in which the zone control concepts as originally set forth in U.S. Pat. Nos. 3,814,404, 3,928,023 are refined and extended. The improved zone controlled blast furnace of this invention can function either as a high capacity hot metal producing blast furnace (MBF) or a high capacity gas producing unit (GBF).

This invention is based on a recognition of: the blast furnace's inherent capacity to efficiently perform the multiple operations required to convert metal oxide burden materials into a quality hot metal (HM, the metallic product removed in a molten condition); its tremendous but only partially used capacity as a gas producer; the fact that expensive coke is made from rapidly diminishing raw materials in an ecologically troublesome batch process; the fact that burden permeability in the bosh where there is a counterflow of downwardly moving molten material and upwardly moving gases is a process limiting factor; the fact that the high temperature heat requirements in the bosh and a high driving rate conflict with the need for economic reduction of burden oxides in the stack; the blast furnace process is presently the least controlled of all major iron and steel making processes; the fact that the productivity of these high capital investment pieces of equipment needs to be increased; and the fact that the quality and uniformity of the product need to be improved.

The search for a better way of supplying blast furnaces with heat and reducing gas has extended over many years. Queen Elizabeth barred the use of charcoal when the forests of England started to be rapidly consumed. Coal wasn't strong enough, coke has always been too expensive, and oil and natural gas are no longer an economically attractive partial substitute. Sir Lothian Bell in the 19th century discovered the wasteful endothermic consumption of carbon (Boudouard reaction $-CO_2+C=2\ CO$), which is called "solution loss", but neither he nor his modern counterparts have been able to economically avoid it.

To improve the process many radical design changes have been proposed e.g., U.S. Pat. Nos. 470,481, 1,704,029, 1,809,326, 1,815,899, 1,836,005, 2,795,497, 2,833,643, 2,919,185, 3,364,009, 3,594,154 and 3,778,045.

U.S. Pat. Nos. 1,289,835, 1,344,977, 1,401,222, 2,807,535, 3,189,438, 3,375,098 and 3,427,013 disclose iron ore reducing processes employing, reducing gases generated outside the shaft furnaces as a total replacement for coke, but the product produced was largely metallic iron in a non-molten form, "direct reduction iron" (DRI). Even though additional high temperature energy is required to put DRI into a molten form, it is a desired product for some uses. Some experts are now advocating its use as a blast furnace charge constituent.

Others working in several countries retained the basic blast furnace design and end product but substituted reducing gas for a portion of the coke conventionally charged. The reducing gas was formed from hydrocarbons outside the blast furnace and injected into the blast furnace stack in the bosh above where molten material is normally found. U.S. Pat. Nos. 2,727,816, 2,790,711, 2,952,533, 3,767,379, 3,811,869, 3,813,229. 3,904,398, 3,935,002 and 3,955,963 employ some combination of hydrocarbons (oil or natural gas [NG] mainly), commercial oxygen and steam to produce the reducing gas needed. U.S. Pat. Nos. 3,458,309, 3,909,446 and 3,912,502 employ combinations of natural gas, recycled top gas, and/or coke oven gas to produce the reducing gas. U.S. Pat. No. 3,767,379 describes a way of using a hydrocarbon fuel plus oxygen.

None of the methods or systems described produce a reducing gas substantially free of $CO_2$ and $H_2O$, or give details concerning how the temperature, volume, and $CO:H_2$ ratio of the reducing gas input can be regulated to economically largely eliminate "solution loss". Tests made in the U.S., Japan and Belgium demonstrated that reducing gas injected through auxiliary tuyeres (herein the term tuyeres is used broadly to include all conduits used to introduce or withdraw materials through the side of a blast furnace) located near the top of the bosh reduce "solution loss" and increase production, but the raw materials consumed in preparing the reducing gas were relatively expensive (hydrocarbons were used). Moreover, the $CO_2$ and $H_2O$ content of the injected reducing gas was high enough to seriously reduce its effectiveness, the $CO:H_2$ balance was not ideal, injection temperatures were not precisely regulated near the maximum effective temperature, and the top gas produced was not converted to an efficient specification product. As a result, the savings anticipated were not realized.

U.S. Pat. No. 3,814,404 disclosed how reducing gas could be generated from low cost coals and lignite and injected in such a manner that it could create, limit and control three zones within the blast furnace, enabling them to perform the various steps of the conventional operation in an improved manner expected to decrease coke consumption "at least 20%" and provide an increase in production. Zone 1 is located in front of the primary tuyeres, zone 2 is the remainder of the bosh extending from the crucible to the mantel, and zone 3 is the portion of the furnace above the mantel. The temperature of the reducing gas at the point of injection was controlled by mixing it with cooler top gas which contained $CO_2$ and $H_2O$. The patent proposed to maintain the temperature of zone 3 at or near but not over 1000° C. by blending within the blast furnace, gases generated in zone 1 with lower temperature reducing gas generated externally.

This invention still further improves the operation and versatility of a zone controlled blast furnace.

DESCRIPTION OF THE INVENTION

This invention recognizes that, if properly controlled, the modern blast furnace is a relatively thermally efficient, ecologically acceptable continuous process capable of performing multiple manufacturing steps and that its performance, productively and return on investment can be greatly improved by: (a) attaining a higher level of overall process control by precisely regulating each zone of activity to avoid causes of malfunction; (b) consuming a wider range of less expensive raw materials, especially raw materials that replace (directly or indirectly) a maximum amount of coke; (c) operating the furnace to substantially avoid the Boudouard reaction, or, alternately taking advantage of the Boudouard reaction to regulate the temperature of the gas withdrawn from the lower portion of zone 3 when the furnace is being used to produce a reducing gas; (d) producing a wider and more diversified range of products including gases and slags made to specifications; or (e) establishing symbiotic relationships between two or more blast furnaces and other production facilities within a blast furnace system.

In one embodiment, this invention contemplates a method of controlling a high capacity molten iron-producing blast furnace (MBF) having three zones, zone 1 being in front of the primary tuyeres, zone 2 being the balance of the bosh extending from the crucible to the mantel, and zone 3 extending above the mantel, and wherein a charge is introduced into the top of the furnace, is preheated and iron oxides are reduced to iron as the charge moves downwardly through zone 3 and is melted in zone 2, which method comprises:

(a) introducing into the top of the furnace a charge containing a iron oxide, flux and from about 460 to about 570 pounds of coke per ton of hot metal, said coke providing a carbonaceous grate and the major portion of the fuel for high temperature heat above about 1000° C. in zones 1 and 2;

(b) burning coke in said charge in zone 1 with oxygen-enriched air to produce a high temperature gas to melt iron and slag in zone 2 and to provide an upwardly moving gas stream whose temperature is reduced to about 1000° C. at about the top of zone 2;

(c) introducing a reducing gas at a temperature of about 1000° C. through tuyeres near the mantel at the bottom of zone 3, said gas containing CO, $H_2$ and $N_2$ and being substantially free of $CO_2$, $H_2O$ and sulfur, said gas providing at least about one-half of the CO and $H_2$ that passes upwardly into zone 3 to reduce the iron oxide to iron;

(d) controlling the introduction of said reducing gas to maintain a $H_2$:CO ratio of at least about 1:6 in said upwardly moving gas near the bottom of zone 3 and to provide sufficient CO to substantially avoid solution loss of coke in zone 3;

(e) withdrawing molten metal and molten slag from near the bottom of the furnace; and (f) withdrawing gas from the top of said furnace having a heat content of from about 100 to about 155 Btu per cubic foot.

In another embodiment (GBF), this invention contemplates operating the blast furnace to produce reducing gas. That embodiment contemplates a method of controlling a reducing gas producing blast furnace having three zones, zone 1 being in front of the primary tuyeres, zone 2 being the balance of the bosh extending from the crucible to the mantel, and zone 3 extending above the mantel, and wherein a charge is introduced into the top of the furnace, is preheated as it moves downwardly through zone 3 and is melted in zone 2, which method comprises:

(a) introducing a charge containing solid carbonaceous matter and slag producing material near the top of the furnace;

(b) burning the carbonaceous material in said charge in zone 1 to melt slag in zone 2 and to provide heat for the endothermic reactions of step (c);

(c) introducing a $CO_2$ and $H_2O$ containing gas into the furnace through tuyeres below the mantel to endothermically react with carbon at a temperature over about 1000° C. to produce CO and $H_2$;

(d) maintaining the temperature of the gas near the bottom of zone 3 at about 1000° C.;

(e) withdrawing gas from tuyeres located near the bottom of zone 3 and above the mantel, said gas having a Btu content per cubic foot of at least about 200, containing CO, $H_2$ and $N_2$ and being substantially free of $CO_2$, $H_2O$ and sulfur;

(f) removing molten metal and molten slag from near the bottom of the furnace; and (g) removing a gas from near the top of said furnace, said gas containing compounds produced by pyrolysis and volatilization in zone 3 and selected from group consisting of hydrocarbons, CO, $CO_2$, $H_2$, $H_2O$, $N_2$ and sulfur compounds.

In particularly preferred embodiments of this invention, the blast furnace has a primary set of tuyeres (for combustion in zone 1), a second set of tuyeres (set 2) near the top of zone 2 below the mantel and two sets of tuyeres (sets 3 and 4) near the bottom of zone 3. The double set of tuyeres near the bottom of zone 3 (that is, near the bottom of the shaft but above the mantel) provides advantages when hot metal or when reducing gas is produced. Tuyere set 3 will be positioned just above the mantel and tuyere set 4, if used, desirably is located as close to tuyere set 3 as practable. In practice, and because of structural factors, tuyere set 4 may be about 3 meters above tuyere set 3. Blast furnaces can, of course, be 30 meters or more tall.

In another preferred embodiment, a zone controlled blast furnace operated in the MBF mode and another zone controlled blast furnace operated in the GBF mode form part of a single system with the GBF furnace supplying reducing gas to the MBF furnace.

Other aspects and embodiments of the invention are discussed below.

Turning first to the hot metal blast furnace (MBF) mode of operation:

The coke charge introduced into the top of the furnace is preferrably minimized to provide only enough for a grate in bosh zones 1 & 2 and to provide the high temperature heat above approximately 1000° C. needed there and not available from other sources. A controlled flow of reducing gas essentially free of $CO_2$ and $H_2O$ is injected through tuyere sets 2 and 3 at temperatures near 1000° C. This gas furnishes at least one-half of the CO, $H_2$ and heat (below 1000° C.) content in the total reducing gas stream passed upward through zone 3. The burden, which in addition to coke, (or an adequate solid substitute such as form coke), contains flux and has approximately twice the conventional amount of metallic oxide/coke ratio.

Above the mantel a heat and chemical reserve is maintained due to the reducing gas to insure that the metal oxides are reduced without substantial "solution loss" and the entire burden is heated to approximately 1000° C. before it reaches the bottom of zone 3. A $H_2$:CO ratio of at least about 1:6 is maintained at the bottom of zone 3 at a level just above tuyere set 3. In addition sufficient CO is introduced into zone 3 to maintain a CO:CO+$CO_2$ ratio throughout zone 3 that favors reduction of iron oxide and substantially avoids solution loss. The required CO:CO+$CO_2$ ratio varies with temperature as shown for instance in FIG. 41 (p. 195) of Gumz "Gas Producers and Blast Furnaces", Wiley and Sons, N.Y. (1950). That Figure sets forth the radio of CO:CO+$CO_2$ needed to favor the reaction, FeO+CO=Fe+$CO_2$ as a function of temperature. Desirably the ratio is maintained at least 10% above the minimum shown in FIG. 41 of the Gumz text.

In the practice of this invention a substantial portion of the metal oxide is reduced to metal by CO in the upper portion of zone 3 and the remainder is reduced, primarily by reaction with hydrogen, in the lower portion of zone 3. In one preferred embodiment of the invention, when iron oxide is charged to the furnace, at least about half of the iron oxide content of the charge is reduced to iron before the charge reaches a temperature of about 800° C.

The coke in zone 1 is consumed with a high temperature blast to produce a high temperature gas volume. The temperature and volume of gas are just sufficient to allow the gas, while moving evenly up through zone 2, to transmit to the slag and HM found there its sensible heat above 1000° C. to consistently attain specification temperatures and to control sulfur. No endothermic reacting inputs such as oil or natural gas need be injected into zone 1. Specification temperature hot metal and slag are withdrawn near the bottom of the furnace and often will have a temperature of from about 1600° C. to about 1700° C. A gas, with an improved Btu content of 100 to 155 Btu per cubic foot, is withdrawn from the top of the furnace.

By minimizing, in MBF mode operations, certain conventional practice problems, favorable chain reactions can be instigated. For example, at high operating levels it is difficult to push the gases generated near the bottom up through the counterflow of molten materials in the bosh. The gas flow through a cross section tends to be uneven, with the volume, temperature and velocity being highest toward the center. High temperature gases escape upward before they can transmit enough of their high temperature heat, and the "solution loss" reaction is aggravated. In MBF practice normally over one-half of the CO and $H_2$ reducing gas content will be introduced through the sides and evenly distributed above where there is a counter flow problem. Even though THM/Hr (tons of hot metal/hour) will increase 50%, the combination of a minimum coke charge, an increased $O_2$ content in the blast and no controllable zone 1 endothermic reactions can result in approximately a 25% reduction in the volume of gas per minute moving up out of zone 2 and a decrease in the slag moving down. The composite result is a large decrease in coke rate, achieved by largely eliminating "solution loss" and by reducing other energy requirements. A large increase in THM/Hr, an improved Btu content top gas, and a more controlled operation measurable in terms of both HM and slag quality and uniformity is also obtained.

Turning next to the gas producing (GBF) mode of operation: Conventional oxidation and reduction reactions, an oxygen enriched blast, and the Boudouard reaction are employed to efficiently consume in zones 1 and 2 a solid carbonaceous charge composed of such low cost materials as low grade coal, lignite, industrial and domestic carbon-containing waste products, including, for example, paper, plastics, rubber or the like. The carbonaceous material is supplied in sufficient quantity to provide a carbon grate in the bosh and to provide heat in the bosh. The heat generated in the furnace will, of course, be sufficient to melt the slag as well as any iron that may be present. Once operating parameters are chosen, it is within the skill of the art to determine the amount of carbon to be charged to the furnace.

Gaseous endothermic reacting materials containing $CO_2$ and $H_2O$, such as process top gases are injected below the mantel through tuyere set 2, and also the primary tuyeres if desired. These gases react above 1000° C. with carbon to produce CO and $H_2$ which, of course, are desirable constituents of a reducing gas.

Endothermic reacting gaseous injections are made to regulate the temperature and the chemical content of the multipurpose gas (MG), withdrawn above the mantel through tuyere set 3, at approximately 1000° C., and that withdrawn through set 4 at a lower temperature. This gas stream will contain $H_2$, CO and $N_2$ but will have no significant content of $CO_2$, $H_2O$ or S compounds.

Top gas from either the MBF or GBF mode can be introduced into the GBF furnace through tuyere set 2. Gas from other sources which contain $CO_2$, such as from a basic oxygen furnace or the like, can, of course also be used. It will be apparent that all or a portion of any given stream can be used and that gases from different sources can be mixed. The gas can contain hydrocarbons in addition to $CO_2$ and $H_2O$ and the hydrocarbons will also be converted to CO and $H_2$ in the process of this invention.

Activities in zone 3 above tuyere set 4 are regulated by the volume of gas generated in zones 1 and 2 which is allowed to progress to the top of the stack. The amount of the generated gas that passes up the stack will vary between approximately 15 and 40%. The pyrolysis activity in zone 3 above tuyere set 4, produces synprodsgas (synthetic products gas), composed of $CH_4$ and other hydrocarbons, CO, $CO_2$, $H_2$, $H_2O$, $N_2$ and S compounds, which is withdrawn at the top.

When operating in the GBF mode metal oxides can be included in the charge, but this is not necessary. When the charge contains iron oxide, molten iron will be withdrawn from the bottom of the furnace. In all embodiments, a gas, which is suitable for use as a reducing gas, boiler fuel, or the like, will be withdrawn near the mantel, slag will be withdrawn from near the bottom, and a gas will be withdrawn from the top. The character of the top gas will change with the carbonaceous and hydrocarbonaceous material charged and the $O_2$ content of the blast. When oil shale is a part of the charge vaporous kerogen will be withdrawn from the top along with top gas. Slag characteristics will vary according to the materials included in the solid charge.

Molten specification slags produced in either mode of operation can be transported to other production units within zone controlled blast furnace systems where they can be blown, or spun, or cast into commercial products or formed into cement clinker, as is or after incorporating additions of powdered materials. The specification gas produced in the MBF mode will be consumed as is or after being improved by blending with MG to the extent required to produce a gas with a Btu content of at least about 155 and with an ecologically acceptable sulfur content. The specification gases produced in the GBF mode will be MG, optionally withdrawn at two different temperatures through tuyere sets 3 and 4, and synprodsgas, which may be further processed, preferably within the system, to produce SCOG (synthetic coke oven gas) employing the same techniques used in processing raw effluent slot coke oven gas and/or a wide variety of other products including plastics, fertilizers, chemicals, fuels, etc. Under some circumstances either MBF top gas or synprodsgas may be reinjected into zone controlled blast furnaces operating in a GBF mode, through either tuyere sets 1 or 2 or both.

The above and other aspects of this invention are based, inter alia, on one or more of the following recognitions and/or discoveries:

D.1. It is undesirable for economic and other reasons at this time to consume oil and natural gas in blast furnaces; to desulphurize HM outside the blast furnace; to use metalized burden materials reduced in other process (e.g. DRI); to rapidly consume the available supply of high grade coking coals; or to spend large amounts of money merely to capture and not advantageously consume pollutants.

D.2. "Solution loss" has in the past been reduced, but without significantly lowering the overall cost of energy/THM. The high level of zone control in MBF or GBF operation can produce maximum gains by both avoiding and fully employing, according to the mode of operation, the Boudouard reaction in consuming diversified energy sources.

D.3. Improved zone controlled blast furnaces, with four sets of tuyeres used to input and output precisely controlled gaseous flows, can produce a maximum amount of high quality hot metal (HM) using a mimimum amount of coke when operated in the MBF mode; or, alternatively, can produce a maximum volume of quality specification gases and slags (gases and slags made to comply with chemical and/or temperature specifications) useful in the manufacture of electrical energy, plastic products and man-made fertilizers, fibers, building materials, chemicals and cement, when operated in the GBF mode. The alternate GBF mode uses maximum amounts of low cost raw materials and no coke. D.4. Tuyere set 4 located in the lower part of zone 3 above tuyere set 3 can, on improved zone controlled blast furnaces, provide the sampling access to the furnace atmosphere in this critical area needed to provide, along with other input and output information, the basis for precise, preferably automated adjustments. These will, when operating in the MBF mode, be made by regulating the gaseous inputs into tuyere sets 1, 2 and 3 and in the GBF mode into tuyere sets 1 and 2 to immediately effect precise changes which in conventional practice would require hours or be impossible. Readily available conventional combinations of electrical, hydraulic and pneumatic controls and valves normally used in advanced gas flow system will be employed.

D.5. When economically operating in the MBF mode, to save coke by largely eliminating, "solution loss", it is desirable to generate outside the furnace from low cost raw materials a large amount of reducing gas than is generated inside; to deliver the reducing gas at a controlled temperature at the bottom of zone 3 to provide both a heat reserve just above tuyere set 3 and a chemical reserve extending to the top of the stack; to improve the quality of the top gas produced to the extent it becomes a desirable specification product having, at least about 100 Btu per cubic foot; to employ a reducing gas which is substantially free of $CO_2$, $H_2O$ and S compounds and has a desirable $H_2$:CO ratio; to maintain throughout zone 3 equilibrium concentrations of CO:$CO_2$ and $H_2$:$H_2O$ conductive to oxide reduction without substantial "solution loss"; and to maintain the lower portion of zone 3 at a temperature very close to but not over about 1000° C.. Some of these practices will achieve other zone control results such as maintaining the volume of reducing gas during MBF operation low enough to insure effective zone 3 gas velocities.

D.6. The inputs which can be regulated to maintain a maximum level of zone control when operating in the MBF mode are: the $O_2$ content in the blast to control the volume and temperature of the gas stream leaving zone 2; the volume and temperature of reducing gas injected through tuyere sets 2 and 3; and the amount of—coke charged (only enough to supply in zones 1 and 2 the carbon grate and the high (over 1000° C.) temperature heat needed and not available from other sources). The endothermic inputs made through tuyere set 1 of such materials as oil, natural gas and steam will be reduced to zero but optionally, heat-supplying exothermic reacting powdered carbonaceous material such as coal can be used.

D.7. Improved zone controlled blast furnaces being operated in a GBF mode can ecomically generate enough high quality reducing gas to make it practical and desirable to eliminate, "solution loss" in a MBF operation. The GBF mode efficiently utilizes a combination of the Boudouard and the water gas reactions and a high temperature, high $O_2$ content (frequently near 50%) blast to consume a cheap solid carbonaceous burden in front of tuyere set 1, while maintaining the high flame temperature needed to generate the high temperature heat employed in zone 1 and the bottom part of zone 2 to produce slag at desired temperatures and optionally a small volume of hot metal. An endothermic input through tuyere set 2 near the bottom of zone 3 can achieve zone control and regulate the temperature and composition of the specification MG (multipurpose gas) withdrawn through tuyere sets 3 and 4 at two different temperatures. A ratio of $H_2$:CO of at least about 1:6, particularly effective at MBF stack temperatures near 1000° C., will be maintained. The portions used as reducing gas can be blended as required for precision temperature control before being used, for example, by being injected into MBF tuyere sets 2 and 3. Solid carbon temperatures safely in excess of 1000° C. and the presence of a molten basic slag will prevent the formation of $CO_2$ and $H_2O$ and remove S. Zone control above tuyere set 4 in zone 3 can be achieved by regulating the amount of gas removed versus that allowed to ascend to the top (approximately 15 to 40% of the total) thereby perpetuating the controlled pyrolysis activity that takes place to produce synprodsgas.

D.8. A high energy yield/lb. of carbon charged can be attained while consuming a minimum amount of high priced raw materials. Commercial $O_2$ is the exception but it is desirable to employ enough to reduce the gas flow out of MBF zone 2 into zone 3 so that high temperature heat generated in zone 1 is retained in zone 2; to increase the Btu content of the top MBF gas by decreasing the $N_2$ content of the reducing gas generated internally and/or externally in a GBF operation; to maximize the volume of endothermic material that can be injected through GBF tuyere sets 1 and 2, and in this way to maximize the total volume of gas that can be produced per hour and per ton of carboniferous material charged; and to help regulate the temperature in GBF zones 1 and 2.

D.9. Tuyere set 4 provides a way of doing accurate preventive-of-malfunction control monitoring of zone 3. Samples taken through tuyere set 4 will advise whether the furnace's up moving gas stream is adequate to insure the desired result as it ascends the stack instead of furnishing late, inadequate information about something that previously happened. Such information is an ideal input to a process control computer which can also receive inputs from the other gaseous input and output locations. Automatic computer controlled adjustments, made in the various tuyeres inputs and the amounts withdrawn through tuyere outputs, in both MBFs and GBFs are sufficient to attain the high level of control sought because most of the operating conditions causing furnace malfunction, can be largely eliminated by employing basic improved zone control methods.

D.10. Metallic oxide reduction in MBF practice can be improved by introducing reducing gas simultaneously into zone 3 both through the bottom and at the sides through tuyere sets 2 and 3. In this manner the reducing gases flowing up are well distributed and channeling and the disproportionate high central flow characteristic of conventional practice (see U.S. Pat. No. 3,588,067) are avoided. Reducing the coke consumed close to an absolute minimum (approximately 460 to 572 lbs/THM) permits approximately double the volume of metal oxides to be maintained in the furnace at all times.

D.11. Large gains can be made by departing further from the conventional practice of withdrawing materials only at the top and near the bottom of the furnace. In the GBF mode of operation it is desirable to vary the endothermic regulating input made through tuyere set 2 according to gases available, the volume of gas sought, the specification gas product being produced, and the manufacturing cost that will result. In MBF practice the ability to remove gases through tuyere sets 3 and 4 provides an opportunity to purge from the stack recycling vaporous undesirable metals such as alkali metals and zinc which cause problems such as reduced production due to impaired burden permeability, scaffolds and channeling, decreased coke strength, excessive refractory lining wear and premature failure, burden degradation, tuyere burning, a high hot metal sulfur content, excessive coke use, a decreased operating rate, and "solution loss" due to the catalytic effect of these metals in zone 3. U.S. Pat. Nos. 12,329, 1,292,937, 1,466,625, 1,729,973, 2,365,868, 2,836,487, 2,877,086, and 3,188,201 all deal with methods of salvaging these materials but not with eliminating them as a cause of malfunction. Even relatively small amounts brought in with various burden materials tend to build up within the furnace and many conventional furnaces are dangerously close to a maximum allowable input. It has been necessary to stockpile millions of tons of valuable but contaminated materials. Three U.S. Pat. Nos. 1,431,877, 1,517,232 and 4,066,443, recognize this problem and propose chemical methods of removal. None of these methods are fully effective and they tend to have an adverse effect on manufacturing costs and hot metal quality (sulphur control). The recycling alkali metals and zinc while they are in a vaporous form can be removed through tuyere sets 3 and 4 before concentrations are allowed to build up which endanger the operation. Reducing gas injected through tuyere sets 2 and 3 can be used to restore the heat lost to the burden during the purge cycle.

D.12. The top gas generated in MBF operations can become the valuable, relatively S free product, blast furnace utility gas (BFUG). Over one-half of it will be derived from the reducing gas produced in a GBF operation and injected. In the GBF, as the result of a high $O_2$ content blast, the MG produced and used as injected reducing gas will have a low $N_2$ content and a high Btu value. The gas volume moving up from in front of MBF tuyere set 1 will also have a reduced $N_2$ content because of the $O_2$ added to the blast, to largely prevent carrying high temperature heat out of zones 1 and 2 into zone 3. The blended gas stream resulting from these two practices will, in some cases be near a desired 155 Btu content which will give it a boiler efficiency equivalent to natural gas (See Exhibit III) and the boiler stack exit gas will have an improved nitrous oxide content. As withdrawn, the Btu content will be between about 100 and 155 depending on the amount of $O_2$ employed in the MBF and GBF blasts. By blending it with a planned excess of MG withdrawn through GBF tuyere set 4, which will have a Btu range between 200 and 280, BFUG with a Btu content between about 155 and the peak efficiency boiler fuel content of near about 250 Btu will be obtained.

D.13. In MBF operations, zones 1 and 2 are controlled largely independent of zone 3 to retain in zones 1 and 2 the heat above 1000° C. By increasing the $O_2$ in the blast, the $N_2$ and overall volume of gas/THM can be reduced enough so that the resulting decreased velocity plus an increase in heat above 1000° C. per lb. of carbon oxidized will result in an optimum transfer of heat above 1000° C. to the liquids and solids in zones 1 and 2. On-line control of MBF zones 1 and 2 can be accomplished entirely through tuyere set 1 by employing the information obtained from the gas samples withdrawn from tuyere set 4.

D.14. In MBF operation the amount of gas generated by consuming coke in zone 1 per ton of hot metal is minimized to increase the operating rate which is largely determined by the rate the generated gas can be pushed through the liquid versus gas counterflow portion of zone 2. Hot metal quality, uniformity and sulphur content, is dependent on avoiding a high volume and uneven flow through zone 2, as is the retention of an adequate amount of heat in zones 1 and 2. By limiting the total coke charged to that which must be consumed in zones 1 and 2 and injecting through tuyere sets 2 and 3 the major portion of the reducing gas that must be employed in zone 3 to eliminate "solution loss" and furnish a heat reserve, a minimum flow through zone 2 can be achieved.

D.15. Improved zone controlled blast furnaces operated either in the MBF or GBF mode can produce valuable specification products for which there is a constant demand. In MBF operations this ability is almost entirely due to an increased level of temperature control in zone 2 and to a decrease in the $N_2$ content in the top gas. In GBF practice the character of the operation is entirely changed. In the main, low cost raw materials are employed and it will be practical to heed the advise of the Japanese nationwide task force dealing with the capture and disposal of ecologically undesirable process by-products—consume them in making needed products. Excess energy can be produced in generating specification gases, which can be employed to melt, pyrolyze (decompose by the presence of heat), crack, and convert large quantities of process gases and dusts without polluting and while replacing, in an economically attractive manner, a large amount of coke oven capacity which universally has been the source of many environmental complaints. The addition to the burden of such materials as oil shale can enrich the synprodsgas stream withdrawn from the top of GBFs. Additional flux type materials blended in the furnace with the carbonaceous charge slag constituents can produce high value specification slags.

D.16. Mineral wool quality insulation product is conventionally made by remelting blast furnace slag in a cupola and then blowing or spinning the molten product into filaments. MBF or GBF practice can consistently produce slags with temperatures close to, but normally not below, 1600° C. which are adequate to produce mineral wool without remelting.

D.17. Precision cast synthetic igneous-rock castings impervious to fire, weather, molds and insect attach can be produced. Their use will not be limited because of relatively low tension limits and unlike reinforced cement the construction steps are few—many will be performed in blast furnaces while producing other products simultaneously. Molten slag can be withdrawn and be transported to where it will be poured into molds in much the same manner as molten metal is cast. Pipes, steel bar, wire or shaped metal can also be placed in the mold in such a manner that it will reinforce the poured sections, expedite connecting them to each other and to foundations and provide access space. Optimally the castings will be interlocking and connectable to other units by steel bars inserted through pipe reinforcing openings. To obtain certain specifications or prolong the pouring cycle the GBF product can be stored temporarily in fired holding and mixing units where additional materials can be added and stirred in. If desired, inorganic pigments can be added to color the product and additives, such as oxides, can be added to adjust the calcium, silicon, aluminum, magnesium and iron contents. The choice of appropriate additives is within the skill of the art.

D.18. A molten blast furnace product can be produced which can be converted, without remelting, into quality cement clinker. A zone controlled blast furnace operating in the GBF mode can make clinker using the basic slag employed to control the S content in MG and in any HM being produced. It is practical to balance the CaO, $SiO_2$, $Al_2O_3$, MgO and $Fe_2O_3$ slag components by charging appropriate calcareous materials such as limestone or other forms of $CaCO_3$, chalk, marl, cement rock, sea shells and marble so that basic eutectic slags are produced with compositions similar to those used in making all normal grades of cement and some with special qualities, which also have excellent desulphurization characteristics. Cement slags can be delivered to a large fired mixer. Samples taken will indicate the additions required which can be stirred into the molten bath ahead of a casting, cooling and/or granulation step employed to produce the cooled clinker then finely ground.

D.19. In GBF practice, no coke need be employed, there is no heavy downward flow of HM and much of the gas is produced by pyrolysis rather than by oxidation or cracking, avoiding a reforming step. Instead of the 100% $O_2$ characteristic of some processes, approximately a 30 to 65% content is employed in the blast. The synprodsgas produced is an excellent substitute for a large portion of the natural gas and petroleum presently consumed in producing a wide variety of products which include: sulphate of ammonia fertilizer, man made fibers such as nylon, plastics, insecticides, pharmaceuticals, paint, creosote, detergents, fungicides, explosives, solvents and other commercial chemicals. When the GBF charge contains amounts of oil shale and/or oil sand, synprodsgas will also contain a fraction suitable for refining into gasoline. Because of the charge options, the Btu content will vary from approximately 400 to 500.

D.20. A synthetic coke oven gas (SCOG) can be made from the GBF synprodsgas stream. The conversion process will be almost identical to that conventionally employed to produce coke oven gas from the gas fuel delivered from conventional by-product coke ovens. The principle components will be $H_2$, CO, $CH_4$ and other hydrocarbons and the Btu content will vary from about 425 to about 480 depending on the amount $O_2$ used in the GBF and the extent the charge employed contains such raw materials as oil shale.

D.21. Steam can be generated from the sensible heat in top gas removed from zone controlled blast furnaces when operating in all modes by installing waste heat boilers or heat exchangers through which top gases will be withdrawn. When in the GBF mode, oil shale is charged the waste heat boiler will also be employed to condense the kerogen in the gas stream and remove if for separate processing.

D.22. Zone controlled blast furnaces can become the key unit(s) in diversified manufacturing systems both large and small but each balanced to operate so that the most capital intensive portions will be able to consistently operate at near maximum capacity and continuously. A maximum amount of process by-products and low cost raw materials can be consistently consumed in an efficient cost reducing manner in the production of valuable products for which there is a relatively steady demand. Ecological problems inherent to the consumption of coal are decreased and the energy related portion of the cost of the products produced will be lower than can be attained employing conventional methods. The demand for HM is not normally constant. By employing multi-purpose furnaces capable of changing quickly from the MBF to the GBF mode of operation, when the need for HM decreases it is possible instead to manufacture specification gases and slags and convert them to electrical energy and long lived building materials such as synthetic igneous rock casting, cement and rock wool insulation for which the demand is expected to be more constant for many years. The GBF mode will have all the best features of their less highly developed prototype, the slagging-ash gas producer, plus those of the most highly developed modern blast furnaces and direct reduction units. They can employ the energy reserve they generate from the consumption of low cost solid carbonaceous materials in zone 1 to utilize the wide range of by-product and low cost raw materials introduced through tuyere sets 1 and 2 and at the top. When operated in the GBF mode to replace coke ovens, ecologically undesirable emissions will be reduced and more of the sulphur present in raw materials, especially coal, will be safely entrapped in slag. Zone controlled blast furnace systems, in which hot metal is the major specification product, will contain at least two improved zone controlled blast furnaces, one operating in the GBF and the other in the MBF mode. To minimize material handling expense, certain other related manufactured units can be included, such as electrical power generation units, direct reduction units, processes consuming slag in a molten state, synprodsgas refinery processes, and oxygen plants. BOSP installations, by delivering their hot and uncleaned top gases to a zone controlled blast furnace system will be able to save much of the high capital, operating and maintenance costs involved in internal gas and dust disposition.

D.23. Even when oil or natural gas (NG) is relatively cheap and readily available, it will frequently be advantageous when operating DR (direct reduction) processes employing reducing gas generators or regenerators consuming oil or NG, to obtain reducing gas from a blast furnace operating in the GBF mode. The gas delivered will be free of any significant content of $CO_2$, H₂O, or S and the delivery temperature can be precisely regulated within the range required. By recycling, without a cooling or cleaning step, the gas removed from the top into a GBF through tuyere sets 1 or 2, it will be possible to convert it back to reducing gas with a minimum use of a low cost fuel. In systems also containing an oxygen generation plant, waste $N_2$ will be available to employ in the cooling section of the DR stack furnace. Even when NG (natural gas) is being wasted it still may, in many cases, be more economic to consume low cost coal or lignite in the gas regeneration process and use the excess gas generated as a portion of the energy required to convert NG to LNG (liquid natural gas), a product welcome for highest and best use in many countries.

D.24. A blast furnace is an improved slagging-ash gas producer. An improved version of a blast furnace is one that is zone controlled. When the zone controlled blast furnace is operated in a GBF mode and four sets of tuyeres, two of which, tuyere set 1 and 2, are used to introduce inputs and two, sets 3 and 4, are used to remove a portion of the gas stream generated in the bosh in zones 1 and 2, the flexibility and efficiency gained is large. When provision is made to use maximum blast temperatures and a high added $O_2$ content in the blast input through tuyere set 1 the practical operating rate becomes very high and the endothermic input allowable very large. By regulating the net endothermic input through tuyere sets 1 and 2 and also by injecting powdered carbonaceous-containing process dusts through tuyere set 1, a maximum carbon to gas yield is obtained. However, when the pyrolysis activities occurring in zone 3 are increased to a maximum point by charging through the top, materials such as oil shale, oil contaminated roll scale, solid industrial and domestic wastes with a high carbonaceous or hydrocarbonaceous content, CO, $H_2$ and hydrocarbons are added to or kerogen contained in the gas stream removed from the top and carbon is added to the char consumed in front of tuyere set 1. By limiting the iron oxide charge to a small amount or none and removing a major portion of the gas formed through tuyere sets 3 and 4, stack permeability problems are minimized and the potential maximum operating rate increased.

The invention may be better understood by reference to the attached drawings.

Figure 1:
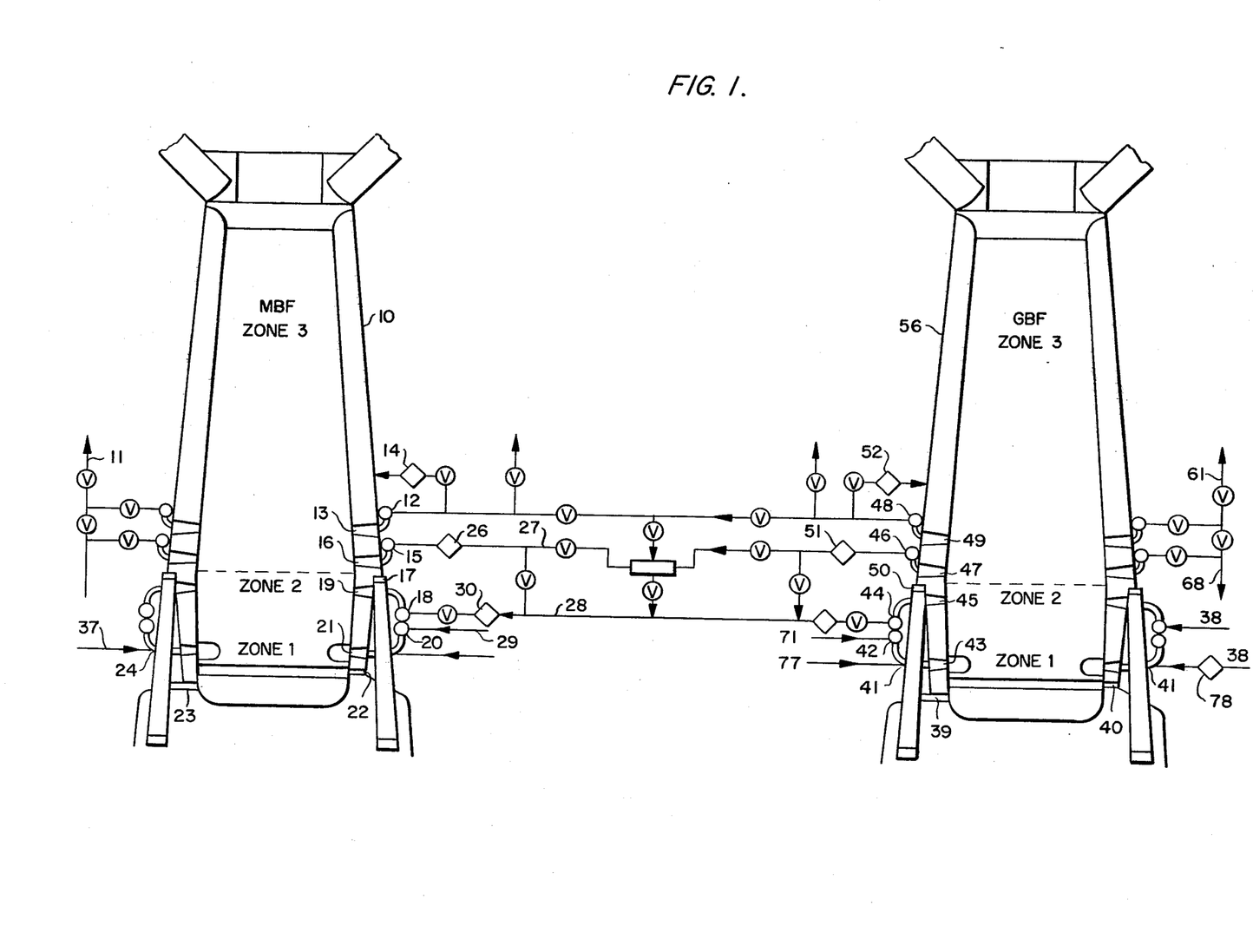
FIG. 1 which is a schematic vertical section view of two zone controlled blast furnaces, one being operated in an MBF mode and the other in a GBF, and a portion of the major conduits, valves and sampling stations that will be employed.
Figure 2:
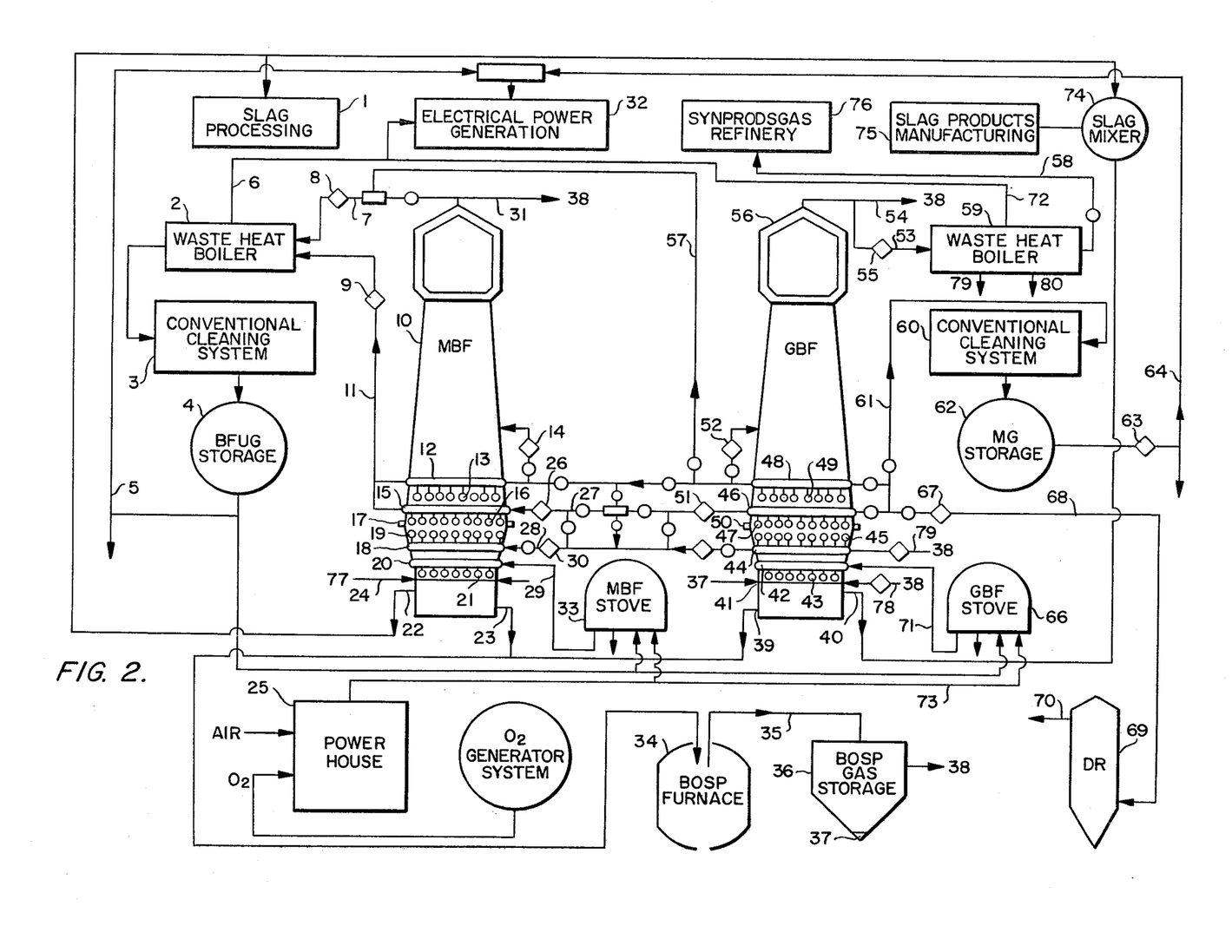
FIG. 2 shows schematically a system suitable for manufacturing the range of specification products described.
Figure 3:
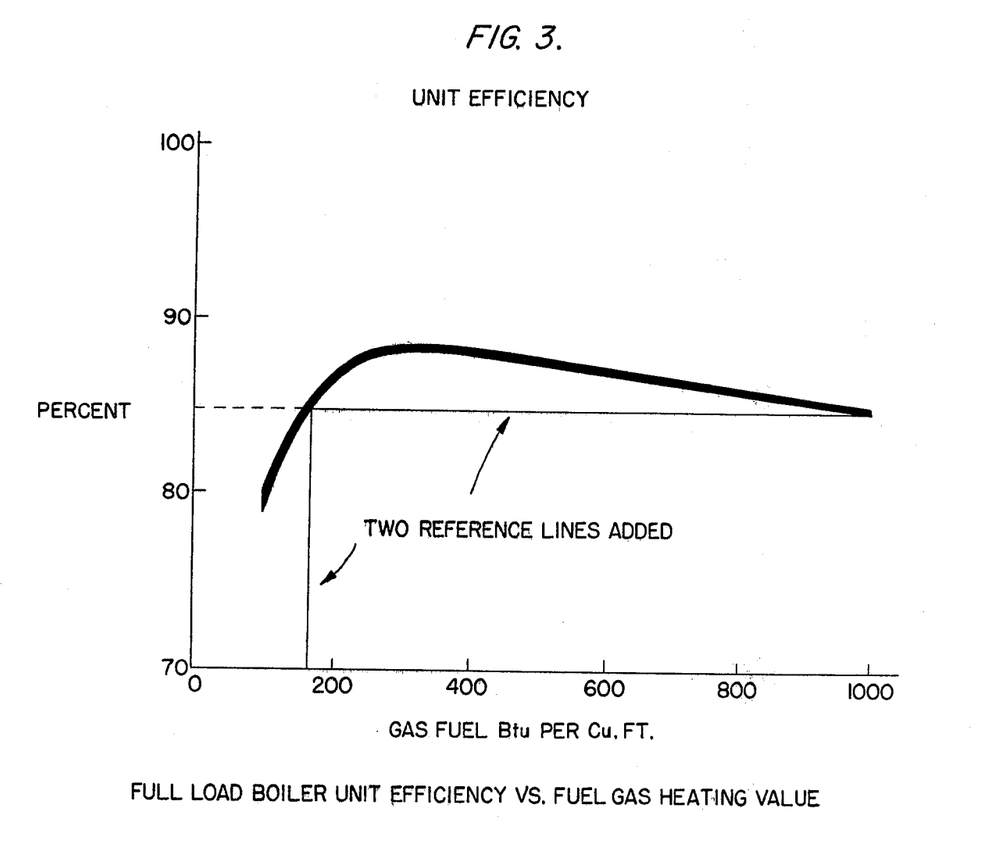
FIG. 3 is a boiler efficiency curve indicating the effect of Btu content on efficiency. These data were presented to EPRI Conference "Power Generation—Clean Fuels Today", April 1974.

Improve zone controlled blast furnaces when operated in either the MBF mode 10 or GBF mode 56, desirably have four sets of tuyeres disposed around the periphery of the furnace, tuyere sets 1, 21 and 43 at the bottom of the bosh, tuyere sets 2, 19 and 45, located just below the mantel 17 and 50, tuyere sets 3, 16 and 47, just above the mantel, tuyere sets 4, 13 and 49, located above set 3 but near the bottom of zone 3. In both modes solid materials, that are not in a powdered form, are charged at the top in a conventional manner except in the MBF the coke charge is only sufficient to provide the coke grate and the high temperature heat above 1000° C. not available from other sources (460 to 570 lbs./THM) and the metal bearing charge is approximately twice the conventional amount of metallic oxide/T coke. In the GBF mode, the conventional coke charge is replaced by low cost coal, lignite or other solid carbonaceous material such as industrial or domestic wastes. The metal bearing charge is small and flux materials, predominately calcareous in nature, are included as required to produce both an adequate desulphurizing slag and cast slags suitable for producing specification products including cement clinker and synthetic-igneous-rock castings. Optionally kerogen and hydrocarbon-bearing materials such as oil shale are included in the charge. In the MBF mode, powdered carbonaceous materials, may be injected through system 24 and in the GBF at 41. The powdered material, 77, in the MBF can be coal, powdered coke breeze, char or other exothermic reacting material containing mainly C. The amount of powdered carbonaceous material injected through the MBF injection system 24 is sufficient when combusted by an $O_2$ enriched blast originated in power house 25 and delivered through conduit 73, to provide enough high temperature heat to make up any difference between the high temperature heat generated by oxidizing with an $O_2$ high temperature blast a minimum amount of coke charged to provide an adequate grate and the additional high temperature heat requirements in zones 1 and 2 needed to produce a uniformly high quality adequately desulphurized HM. In the GBF the dust charge may be any combination of finely divided process dust, 37, such as blast furnace flue dust, BOSP 34, dust transferred through conduit 35 to BOSP gas storage vessel 36, which have either a high Fe or C content. The hot blast heated in MBF and GBF stoves 33 and 66, conducted through conduits 29 and 71, injected through bustle pipe 20 and tuyere set 21 in the MBF and bustle pipe 42 and tuyere set 43 in the GFB is $O_2$ enriched in both cases, but to a varying degree. In the MBF enough $O_2$ is used in the blast to reduce the volume of the gas generated in zone 1 enough to enable it to transmit its heat above 1000° C. to the burden before leaving zone 2. In the GBF the $O_2$ content in the blast introduced into tuyere set 43 through bustle pipe 42 is sufficient to attain a desired flame temperature, production rate and MG quality.

Enough reducing gas (MG) is produced in the GBF 56 and withdrawn through tuyere sets 47 and 49 and thence to bustle pipes 46 and 48 and brought into the MBF through bustle pipes 15 and 18 and tuyere sets 16 and 19 to create a heat reserve just under 1000° C. at the bottom of zone 3 and a chemical reserve throughout the length of zone 3 in which a continuously reducing atmosphere is maintained that is adequate to insure reduction of a well prepared iron oxide burden before it leaves the zone, without incurring any significant "solution loss". Over one-half of the gas employed in MBF zone 3 is produced in a GBF and injected as described.

The temperature and composition of MG used as reducing gas is regulated by endothermic gaseous inputs made through GBF tuyere sets 43 and 45 before it is withdrawn through tuyere sets 47 and 49. The extent and character of the endothermic reactions in front of tuyere set 45 is on-line regulated, on the basis of samples taken at tuyere set 46, sample station 51, to insure that all materials injected are being converted to a gas composed of CO, $H_2$ and $N_2$, that the $H_2$:CO ratio is at least about 1:6, and that the desired gas stream temperature of close to 1000° C. is being obtained.

The gaseous inputs made through GBF bustle pipe 42 and tuyere set 43 is regulated so as to utilize the Boudouard reaction to the maximum economic degree. The amount of $CO_2$ and $H_2O$ containing gas injected there is regulated to attain a desired flame temperature at an ecomonic usage of $O_2$. The economic level of $O_2$ will depend on the specified Btu content of the BFUG and MG gas being delivered and the GBF gas production rate required. When, for example, approximately 50% of the $O_2$ in the hot blast used in the GBF is from commercial $O_2$, the amount of MG which must be blended with MBF top gas to produce a BFUG with a 155 Btu content will be relatively small. The top gas leaving MBF's through conduit 7 will normally be converted to BFUG by the addition of a measured amount of MG made through conduit 57 ahead of waste heat boiler 2. An alternate use will be to inject some portion into the GBF through conduit 31 injection system 4 ahead of tuyere set 43 or into bustle pipe 44 thence to tuyere set 45.

MG used as reducing gas is withdrawn through tuyere set 47, at close to 1000° C. That withdrawn through 49 is at a lower temperature and may be used also for a variety of other purposes. The stream going into tuyere sets 16 and 19 through bustle pipes 15 and 18 can be independently regulated by varying the amount obtained from each set of GBF tuyeres.

Quartered gas samples are withdrawn through MBF tuyere set 13 and GBF tuyere set 49 via bustle pipes 12 and 48 and the analysis results furnished a process control computer. The excess gas is returned to the stacks.

Zone control in GBF zone 3, because the amount of MG delivered to MBF's or DR is determined by their requirements, will be attained by regulating the volume of MG withdrawn through tuyere set 49 into bustle pipe 48 thence by conduit 61 to GBF conventional cleaning system 60 then to MG gas storage 62 and the amount sent up through GBF zone 3. The temperature of the rising gas stream is measured at sample station 52 of gas withdrawn at tuyere 49 and the top at sample station 55 to make certain that it is being kept high enough to insure pyrolysis of the coal or other hydrocarbon containing material charged, before the burden descends to tuyere 49 level.

The HM withdrawn at MBF notch 23 and GBF notch 39 will normally be delivered direct to the BOSP 34 without the need for an outside the furnace desulphurization step.

Slag is removed through MBF notch 23 and GBF notch 40. The MBF top gas withdrawn at 7 will, as made (low $N_2$ reducing gas used), be BFUG or become BFUG by blending with enough MG delivered through conduit 57 to bring its Btu content up to at least 155.

Synprodsgas is withdrawn at the top of the GBF through conduit 53. Its Btu content will vary, according to the hydrocarbon containing materials other than coal or lignite, charged at the top, from about 400 to 500. It goes to synprodsgas refinery 76 through conduit 53, sampling station 55, GBF waste heat boiler 59 and conduit 58. When oil shale is charged the waste heat boiler will be used to condense in addition to tar, kerogen. These will be withdrawn at 79 and 80. A major product usually separated with be SCOG with a Btu content of approximately 425 to 480. Optionally synprodsgas will be diverted through conduit 54 and utilized hot and dirty as endothermic temperature regulating input (38) made into either tuyere set 43 or 45 through bustle pipes 44 or injection system 41.

Process control computer complexes optionally controlling zone controlled blast furnaces by automated means, can receive information from a variety of sources but the most important will include: information obtained from on-line samples taken at GBF sample station 51 of gas withdrawn from bustle pipe 46 and the temperature of the gas at sample station 52 of gas withdrawn from bustle pipe 48; information concerning gas composition, temperature and pressure obtained from on-line MBF samples taken at station 14 from gas withdrawn from bustle pipe 12 and at sample station 8 of gas withdrawn from the top of MBF 10; the gas temperature, flow rate and pressure taken of samples from station 30 ahead of tuyere set 19 and station 26 ahead of tuyere set 16; information obtained during purge cycles from the samples which will be taken at sample station 9 ahead of waste heat boiler 2 and the Zn, K and Na content determined; the measured content and temperature of the synprodsgas stream leaving the GBF through conduit 53 and samples at station 55 will be analyzed for composition and temperature; the temperature and composition of the uncleaned MG delivered to DR 69 through conduit 68 will be obtained from samples taken at 67; the various gaseous endothermic inputs (38) injected into GBF tuyere sets 43 and 45 through injection system 41 and bustle pipe 44 will be sampled at stations 78 and 79 and information concerning composition and temperature input to the control computer; and the temperature and Btu content taken at sample station 63 of the MG gas from storage stream delivered through conduit 64 to electric power generation 32 and other MG users.

The process control computer can employ the on-line information obtained to adjust the various gas flows as required to maintain a zone controlled operation in both MBF's and GBF's in the system and make gaseous specification product deliveries to the other operating units in the system and to outside users through BFUG storage 4 and MG storage 62. The methods of manipulating the gas flows in the manner required will be similar to that applied on many industrial units other than blast furnaces i.e., DR installations, petroleum refineries, petrochemical plants, etc.

When tests, MBF malfunction, or past experience indicate a purge cycle is needed the valves in conduit 27 controlling the delivery of reducing gas to bustle pipe 15 are closed, the total flow reduced and delivered to bustle pipe 18. Simultaneously the blast is proportionately reduced. The valves between tuyere set 16 and conduit 11 are opened to divert the much reduced flow containing Zn and Na in vapor form, to waste heat boiler 2 and conventional wet cleaning system, 3. Effluent, from the cleaning system can be diverted to a Doer thickner. After the burden has descended a measured amount, the valve between tuyere set 16, bustle pipe 15, and conduit 11 is closed. The blast and other inputs through MBF tuyere set 21 are further reduced and the reducing gas inputs through tuyere sets 16 and 19 are resumed, by opening the valves to conduits 27 and 28 long enough to furnish the burden above tuyere set 16 the heat lost during the first phase of the purge. When this has been accomplished the inputs through 16 and 19 and the blast into 21 are again reduced until the burden has descended a measured number of feet. During this period the purge flow leaving through tuyere set 13, bustle pipe 12 and conduit 11 will contain a major portion of any K and KCN that has been recycling. After the valve from 12 into conduit 11 is closed at the end of the purge cycle the blast through tuyere set 21 is again largely withdrawn until the reducing gas injected through 16 and 19 at a normal or temporarily increased volume has furnished enough heat to bring the heat reserve area in zone 3 up to close to 1000° C. At that time the normal input through tuyere set 21 is resumed completing the purge cycle and the effluent from 3 will be returned to its normal flow pattern.

Slag removed from MBF notch 22 is delivered to an MBF slag processing location 1. Slag removed from GBF slag notch 40 is delivered at near the temperature withdrawn to a slag products manufacturing area 75, suitably equipped to manufacture cement clinker and pour synthetic-igneous-rock castings. It can be held at temperature in a slag mixer, 74, adjoining storage capacity for finely ground materials used in the manufacture of cement clinker. In some instances MBF slag will also be delivered to slag mixer 74. The additions required to produce the ordered cement or castings specifications can be added before the pouring, cooling and/or granulation manufacturing steps are taken.

Steam from the MBF and GBF waste heat boilers 2 and 59 is delivered through conduits 6 and 72 to the electrical power generation unit 32. BFUG can also be delivered there through conduit 5 and/or MG through conduit 64. These gases are acceptably free from S and particulate matter. The flow of MG going to DR units is temperature regulated by blending gas removed at GBF tuyere sets 49 and 47 to the extent required to obtain a required injection temperature. DR exit gas, 70 is recycled to GBF, 56, through conduit 41.

Since variations of this invention will be apparent to those skilled in the art, it is intended that this invention be limited only by the scope of the claims.

I claim:

1. A method of controlling a molten iron-producing blast furnace having three zones, zone 1 being in front of the primary tuyeres, zone 2 being the balance of the bosh extending from the crucible to the mantel, and zone 3 extending above the mantel, said blast furnace having at least three sets of tuyeres, and wherein a charge is introduced into the top of the furnace, is preheated, iron oxides are reduced to iron as the charge moves downwardly through zone 3, and is melted in zone 2, which method comprises:
    (a) introducing into the top of the furnace a charge containing a iron oxide, flux and from about 460 to about 570 pounds of coke per ton of hot metal, said coke providing a carbonaceous grate and the major portion of the fuel for high temperature heat above about 1000° C. in zones 1 and 2;
    (b) burning coke in said charge in zone 1 with oxygen-enriched air introduced through said primary set of tuyres to produce a high temperature gas to melt iron and slag in zone 2 and introducing a reducing gas through tuyeres located in zone 2 to provide an upwardly moving gas stream whose temperature is reduced to about 1000° C. at about the top of zone 2;
    (c) introducing a reducing gas at a temperature of about 1000° C. through tuyeres near the mantel at the bottom of zone 3, said gas containing CO, $H_2$ and $N_2$ and being substantially free of $CO_2$, $H_2O$ and sulfur, said gas providing at least about one-half of the CO and $H_2$ that passes upwardly into zone 3 to reduce the iron oxide to iron;
    (d) controlling the introduction of said reducing gas to maintain a $H_2$:CO ratio at least about 1:6 in said upwardly moving gas near the bottom of zone 3 and to provide sufficient CO to substantially avoid solution loss of coke in zone 3;
    (e) withdrawing molten iron and molten slag from near the bottom of the furnace; and
    (f) withdrawing gas from the top of said furnace having a heat content of from about 100 to about 155 Btu per cubic foot.

2. The method of claim 1 wherein the blast furnace has two sets of tuyeres at different levels near the bottom of zone 3.

3. The method of claim 2 comprising sampling gases using the upper of said two sets of tuyeres for control of furnace combustion in zone 1 and introduction of reducing gases into the furnace.

4. The method of claim 2 comprising introducing reducing gas into the blast furnace through the lower set of tuyeres in zone 3 and through tuyeres located at the top of zone 2.

5. The method of claim 1 comprising periodically removing gases through tuyeres in the lower portion of zone 3 in order to purge undesirable vaporous metal from the furnace.

6. The method of claim 1 comprising removing the slag at a temperature of at least about 1600° C. and blowing the slag to produce mineral wool.

7. The method of claim 1 comprising introducing reducing gas into said furnace having a heating value of from about 200 to 280 Btu per cubic foot.

8. A method of controlling a reducing gas producing blast furnace having three zones, zone 1 being in front of the primary tuyeres, zone 2 being the balance of the bosh extending from the crucible to the mantel, and zone 3 extending above the mantel, said blast furnace having at least three sets of tuyeres, and wherein a charge is introduced into the top of the furnace, is preheated as it moves downwardly through zone 3 and is melted in zone 2, which method comprises:
    (a) introducing a charge containing solid carbonaceous matter, and a metal and slag producing material near the top of the furnace;
    (b) burning the carbonaceous material in said charge in zone 1 to melt slag in zone 2 and to provide heat for the endothermic reactions of step (c);
    (c) introducing a $CO_2$ and $H_2O$ containing gas into the furnace through tuyeres below the mantel to endothermically react with carbon at a temperature over about 1000° C. to produce CO and $H_2$;
    (d) maintaining the temperature of the gas near the bottom of zone 3 at about 1000° C.;
    (e) withdrawing gas from tuyeres located near the bottom of zone 3 and above the mantel, said gas having a Btu content per cubic foot content of at least about 200, containing CO, $H_2$ and $N_2$ and being substantially free of $CO_2$, $H_2O$ and sulfur;
    (f) removing molten metal and molten slag having a temperature of at least about 1600° C. from near the bottom of the furnace; and
    (g) removing a gas from near the top of said furnace, said gas containing compounds produced by pyrolysis and vaporization in zone 3 and selected from the group consisting of hydrocarbons, CO, $CO_2$, $H_2$, $H_2O$, $N_2$ and sulfur compounds.

9. The method of claim 8 wherein said blast furnace has two sets of tuyeres at different levels near the bottom of zone 3.

10. The method of claim 8 comprising withdrawing gas near the bottom of zone 3 having a Btu content of from about 200 to about 280;

11. The method of claim 8 comprising charging coal to the top of said blast furnace.

12. The method of claim 9 comprising withdrawing reducing gas at different temperatures from each set of tuyeres near the bottom of zone 3.

13. The method of claim 8 comprising passing from about 15% to about 40% of the total gas leaving zone 2 upwardly to the top of the furnace.

14. The method of claim 8 comprising including calcareous materials in the charge to the furnace to provide a cement slag.

15. The method of claim 14 comprising withdrawing slag from said furnace, and cooling and pulverizing said slag to provide a cement.

16. The method of claim 14 comprising adding inorganic additives to adjust at least one component selected from the group consisting of calcium, silicon, aluminum, iron and magnesium.

17. The method of claim 8 comprising removing slag from the bottom of the furnace and blowing said slag to produce mineral wool.

18. The method of claim 8 comprising employing a charge that includes iron oxide to the top of said furnace and withdrawing molten iron from the bottom of the furnace.

19. The method of claim 8 comprising withdrawing molten slag from said furnace and forming said slag into castings.

20. The method of claim 19 comprising including metal reinforcing in said castings.

21. The method of claim 19 comprising adding pigments to said slag.

22. The method of claim 8 comprising including in the solid charge and withdrawing vaporous kerogen from the top of the blast furnace along with top gas.

23. A method of operating blast furnaces which comprises:
   I. controlling molten iron-producing blast furnace having three zones, zone 1 being in front of the primary tuyeres, zone 2 being the balance of the bosh extending from the crucible to the mantel, said blast furnace having at least three sets of tuyeres, and zone 3 extending above the mantel, and wherein a charge is introduced into the top of the furnace, is preheated, iron oxides are reduced to iron as the charge moves downwardly through zone 3 and is melted in zone 2, which method comprises:
   (a) introducing into the top of the furnace a charge containing iron oxide, flux and from about 460 to about 570 pounds of coke per ton of hot metal, said coke providing a carbonaceous grate and the major portion of the fuel for high temperature heat above about 1000° C. in zones 1 and 2;
   (b) burning coke in said charge in zone 1 with oxygen-enriched air introduced through said primary set of tuyeres to produce a high temperature gas to melt iron and slag in zone 2 and introducing a reducing gas through tuyeres located in zone 2 to provide an upwardly moving gas stream whose temperature is reduced to about 1000° C. at about the top of zone 2;
   (c) introducing a reducing gas at a temperature of about 1000° C. through tuyeres near the mantel at the bottom of zone 3, said gas containing CO, $H_2$ and $N_2$ and being substantially free of $CO_2$, $H_2O$ and sulfur, said gas providing at least about one-half of the CO and $H_2$ that passes upwardly into zone 3 to reduce the iron oxide to iron;
   (d) controlling the introduction of said reducing gas to maintain a $H_2$:CO ratio of at least about 1:6 in said upwardly moving gas near the bottom of zone 3 and to provide sufficient CO to substantially avoid solution loss of coke in zone 3;
   (e) withdrawing molten iron and molten slag from near the bottom of the furnace; and
   (f) withdrawing gas from the top of said furnace having a heat content of from about 100 to about 155 Btu per cubic foot; and which further comprises:
   II. controlling a reducing gas producing blast furnace having three zones, zone 1 being in front of the primary tuyeres, zone 2 being the balance of the bosh extending from the crucible to the mantel, said blast furnace having at least three sets of tuyeres, and zone 3 extending above the mantel, and wherein a charge is introduced into the top of the furnace, is preheated as it moves downwardly through zone 3 and is melted in zone 2, which method comprises:
   (a) introducing a charge containing solid carbonaceous matter and slag producing material near the top of the furnace;
   (b) burning the carbonaceous material in said charge in zone 1 to melt slag in zone 2 and provide heat for the endothermic reactions of step (c);
   (c) introducing a $CO_2$ and $H_2O$ containing gas into the furnace through tuyeres below the mantel to endothermically react with carbon at a temperature over about 1000° C. to produce CO and $H_2$;
   (d) maintaining the temperature of the gas near the bottom of zone 3 at about 1000° C.;
   (e) withdrawing gas from tuyeres located near the bottom of zone 3 and above the mantel, said gas having a Btu content per cubic foot content of at least about 200, containing CO, $H_2$ and $N_2$ and being substantially free of $CO_2$, $H_2O$ and sulfur and introducing at least a portion of said gas in step I(c) above;
   (f) removing molten slag having a temperature of at least about 1600° C. from near the bottom of the furnace; and
   (g) removing a gas from near the top of said furnace, said gas containing components selected from the group consisting of hydrocarbons volatilized and pyrolysed in zone 3, CO, $CO_2$, $H_2$, $H_2O$, $N_3$ and sulfur compounds.

24. The method of claim 23 comprising withdrawing gases in step II(e) from at least two different sets of tuyeres near the bottom of zone 3 and mixing portions of the withdrawn gases before they are introduced at step I(c).

* * * * *